United States Patent Office 3,088,913
Patented May 7, 1963

3,088,913
FOAM INHIBITED GLYCOL BASED ANTIFREEZE COMPOSITION
Frank J. Milnes, Spencerport, and Chester M. White, Rochester, N.Y., assignors to Olin Mathieson Chemical Corporation, a corporation of Virginia
No Drawing. Filed Nov. 17, 1955, Ser. No. 547,530
4 Claims. (Cl. 252—73)

Our invention relates to an improved antifreeze composition which has ethylene glycol as a base.

Higher saturated fatty alcohols have been used as defoamers for ethylene glycol antifreeze solutions for some time. However, in single phase antifreeze products, it is necessary to dissolve the fatty alcohol in the glycol component at the time of manufacture. Upon dilution with water, the fatty alcohol separates and forms a water insoluble phase on the surface of the glycol in the radiator reservoir. The $C_8$–$C_{14}$ fatty alcohols, which are soluble to about 0.15% (by weight) in glycol, have been employed for this application because of the greater glycol solubility. The higher saturated fatty alcohols ($C_{16}$–$C_{18}$) exhibit negligible solubility in glycol concentrate. $C_{16}$ and $C_{17}$ alcohols, for example, are soluble to less than 0.03% whereas $C_{18}$ has a solubility of less than 0.01%.

Antifreeze compositions should possess a low tendency to foam when admixed with water. A presently used laboratory defoaming test involves passing 2000 cc./min. of air through 300 cc. of a 25% (by volume) aqueous antifreeze solution which is placed in a 1000 cc. graduate and held at a temperature of 180° F. Air is aspirated through the antifreeze solution by a diffusion stone for a 5-minute period after which the volume of entrained air is determined by observing the total volume of liquid and air and subtracting the liquid volume. This volume cannot exceed 540 cc. (340 cc. liquid plus 200 cc. air). Under this test procedure, the saturated fatty alcohols of $C_8$–$C_{14}$ are not sufficiently effective to meet this test.

In accordance with our present invention, we have proved that the $C_{18}$ unsaturated alcohols such as oleyl and ricinoleyl are surprisingly more soluble in glycol than the corresponding saturated members and are extremely effective defoamers as measured by the above test. For example, oleyl alcohol is soluble to a concentration of 0.05% by weight) in glycol. The total volume (in the above defoaming test) amounts to 400 cc. Oleyl alcohol is also an effective defoamer at 0.01% concentration. Ricinoleyl alcohol is soluble to 0.10% (and higher) and is an effective defoamer (total volume 400 at 0.05%). The fatty alcohols, obtained from the reduction of linseed fatty acids, contain 18 carbons with two or three double bonds. This alcohol mixture is more soluble in glycol than the oleyl alcohol and is a very good defoamer (total volume 380 cc.). Hence, our invention relates to an ethylene glycol base antifreeze containing dissolved therein an unsaturated monohydric alcohol having 18 carbon atoms in amount sufficient to substantially decrease the tendency of the composition to foam when admixed with water.

Besides being of a low foaming tendency, the antifreeze of our invention possesses other desirable properties. Thus, the unsaturated alcohols have lower melting points than their saturated analogues, and this property, coupled with their higher solubility, makes them less prone to freeze from the concentrated antifreeze.

As an illustration of the preparation of a composition falling within the broad scope of our invention, the following ingredients are admixed in the following proportions by weight: ethylene glycol, 96.977; borax, 2.0; oleyl alcohol, 0.02; water, 1.0; and rhodamine B 0.003. The ethylene glycol employed is a commercial grade of ethylene glycol containing about 10% by weight of diethylene glycol.

Various modifications can be made in the specific illustration to provide other embodiments which fall within the scope of our invention. The specific composition of the ethylene glycol base can be varied widely, typical suitable blends being the following where the percentages are by volume:

Ethylene glycol 95%:diethylene glycol 5%
Ethylene glycol 95%:propylene glycol 5%
Ethylene glycol 90%:propylene glycol 10%
Ethylene glycol 80%:propylene glycol 20%
Ethylene glycol 76%:diethylene glycol 4%:propylene glycol 18%:dipropylene glycol 2%

In place of the borax there can be substituted other corrosion inhibitors, such as sodium metaborate or other alkali metal borate. A wide variety of compounds useful as corrosion inhibitors in ethylene glycol base antifreeze compositions are well known to the art. Also, in place of the rhodamine B, there can be substituted other stable, water soluble dyes of distinctive color, such as alizarine cyanine green G extra.

In place of the oleyl alcohol used in the specific illustration there can be substituted other unsaturated monohydric alcohols having 18 carbon atoms. For example, in addition to the ricinoleyl alcohol and alcohols obtained by the reduction of linseed fatty acids to form the corresponding alcohols, there can be substituted linoleyl alcohol, alpha-eleostearyl alcohol, beta-eleostearyl alcohol, or alpha-linolenyl alcohol, as well as mixtures of alcohols obtained by the reduction of, for example, soya bean fatty acids or cottonseed fatty acids to the corresponding alcohols. The amount of unsaturated monohydric alcohol present in the antifreeze will depend upon the extent to which it is desired to depress the tendency of the antifreeze to foam when it is admixed with water, and will generally be at least about 0.005% by weight.

We claim:
1. An ethylene glycol base antifreeze containing dissolved therein an unsaturated monohydric alcohol having eighteen carbon atoms in amount sufficient to substantially decrease the tendency of the composition to foam when admixed with water said amount of monohydric alcohol being from about 0.005 to 0.05 percent by weight.
2. A composition according to claim 1 in which said alcohol is oleyl alcohol.
3. A composition according to claim 1 in which said alcohol is ricinoleyl alcohol.
4. A composition according to claim 1 in which said alcohol is a mixture of alcohols obtained by the reduction of linseed oil fatty acids to the corresponding alcohols.

References Cited in the file of this patent
UNITED STATES PATENTS

| | | |
|---|---|---|
| 2,264,362 | Clapsadle | Dec. 2, 1941 |
| 2,298,465 | Clapsadle | Oct. 13, 1942 |
| 2,344,671 | Bertsch | Mar. 21, 1944 |
| 2,430,858 | Borsoff et al. | Nov. 18, 1947 |
| 2,797,198 | Chappell | June 25, 1957 |

FOREIGN PATENTS

| | | |
|---|---|---|
| 429,423 | Great Britain | May 23, 1935 |